(12) United States Patent
Forghani-zadeh et al.

(10) Patent No.: US 8,125,800 B2
(45) Date of Patent: Feb. 28, 2012

(54) SECONDARY-SIDE AMPLIFIER WITH SOFT START

(75) Inventors: H. Pooya Forghani-zadeh, Dallas, TX (US); Luis Alberto Huertas-Sanchez, Allen, TX (US); Gregory Wallis Collins, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 366 days.

(21) Appl. No.: 12/253,711

(22) Filed: Oct. 17, 2008

(65) Prior Publication Data
US 2009/0185397 A1 Jul. 23, 2009

Related U.S. Application Data

(60) Provisional application No. 60/980,691, filed on Oct. 17, 2007.

(51) Int. Cl.
*H02M 3/335* (2006.01)
*G05F 1/00* (2006.01)
(52) U.S. Cl. .................... 363/21.15; 323/287
(58) Field of Classification Search .... 363/21.12–21.18; 323/282, 285–287
See application file for complete search history.

(56) References Cited

U.S. PATENT DOCUMENTS

| | | | | |
|---|---|---|---|---|
| 5,426,350 A * | 6/1995 | Lai | ................................. | 315/244 |
| 5,513,088 A | 4/1996 | Williamson et al. | | |
| 6,172,550 B1 * | 1/2001 | Gold et al. | .................... | 327/366 |
| 6,411,044 B2 * | 6/2002 | Wessels et al. | ................ | 315/244 |
| 6,426,886 B1 * | 7/2002 | Goder | ........................ | 363/21.18 |
| 6,795,783 B2 * | 9/2004 | Kotlow et al. | ................... | 702/65 |
| 6,813,170 B2 * | 11/2004 | Yang | .......................... | 363/56.09 |
| 7,239,532 B1 | 7/2007 | Hsu et al. | | |
| 7,773,392 B2 * | 8/2010 | Matsumoto | ................ | 363/21.08 |

OTHER PUBLICATIONS

"TL431/TL431A Programmable Shunt Regulator," Fairchild Semiconductor, 2011, pp. 1-10, URL http://www.fairchildsemi.com.
"Power Over Ethernet, IEEE 802.3af PD Interface With Integrated Switching Regulator," Linear Technology, LTC4267, pp. 1-32.
"Integrated 100-V IEEE 802.3af PD and DC/DC Controller," TPS12750 and TPS23770, Texas Instruments, SLVS590B, Jul. 2005, pp. 1-40, URL http//www.ti.com.
"High Performance, Integrated Current Mode PWM Controllers," CS5124, On Semiconductor, Jul. 2009, pp. 1-11, URL http://onsemi.com.

* cited by examiner

*Primary Examiner* — Adolf Berhane
*Assistant Examiner* — Jue Zhang
(74) *Attorney, Agent, or Firm* — William B. Kempler; Wade J. Brady, III; Frederick J. Telecky, Jr.

(57) ABSTRACT

An isolated switching regulator has a closed-loop soft-start feature that allows tighter regulation of the output voltage and eliminates or reduces overshoot. It also has an optional reset feature which will resoft-start the regulator during recovery from a fault on the output voltage.

18 Claims, 7 Drawing Sheets

SECONDARY-SIDE AMPLIFIER WITH SOFT START

CROSS REFERENCE TO RELATED APPLICATIONS

This application claims the benefit of U.S. application Ser. No. 60/980,691 filed on Oct. 17, 2007, which is incorporated herein in its entirety by reference.

FIELD OF THE INVENTION

This application relates to isolated switching regulators and more specifically to a soft-start circuit for such regulators.

BACKGROUND OF THE INVENTION

Figure 1:
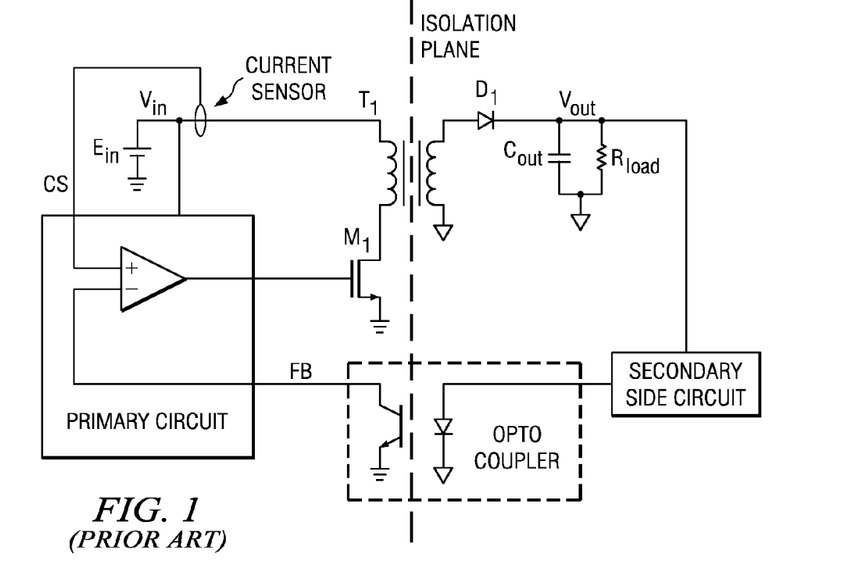
FIG. 1 is a block diagram of an isolated switching regulator.

Isolated switching regulators are commonly used in consumer devices with high input voltages to convert them to lower voltages required by subsystems and safely separate users from hazardous high voltages. The isolation is usually provided by using transformer in power stage and opto-coupler in feedback path as shown in FIG. 1 for an example of an isolated flyback topology. The circuit is therefore divided to primary and secondary sides. While primary side contains gate drive, PWM comparator, and over current protection circuits, secondary-side circuit contains error amplifier and reference voltage. However, because of isolation required, secondary and primary side cannot be integrated in a single integrated circuit (IC).

Figure 2:
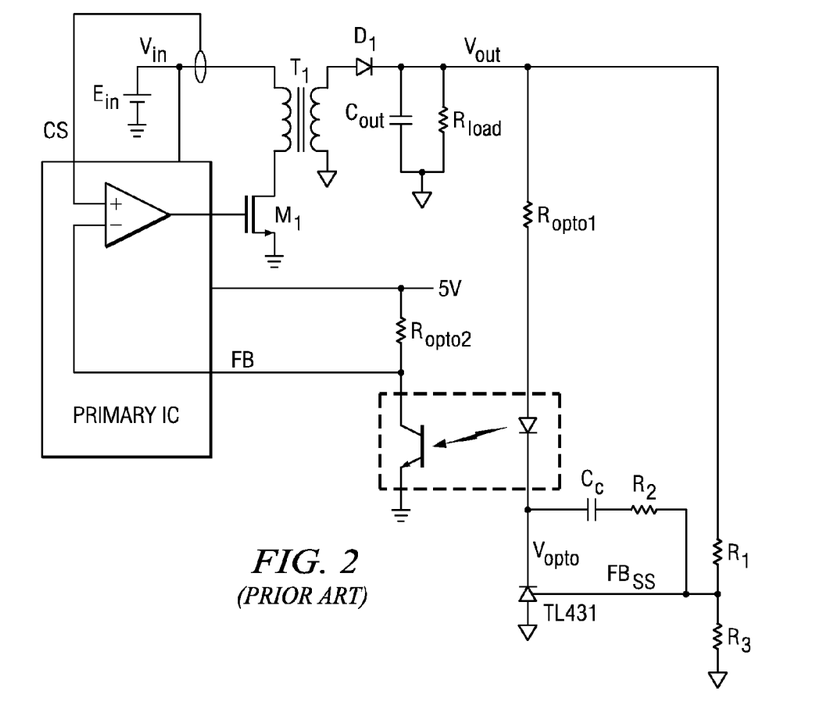
FIG. 2 is a block diagram of a prior art isolated regulator having an open-loop soft-start circuit.
Figure 3:
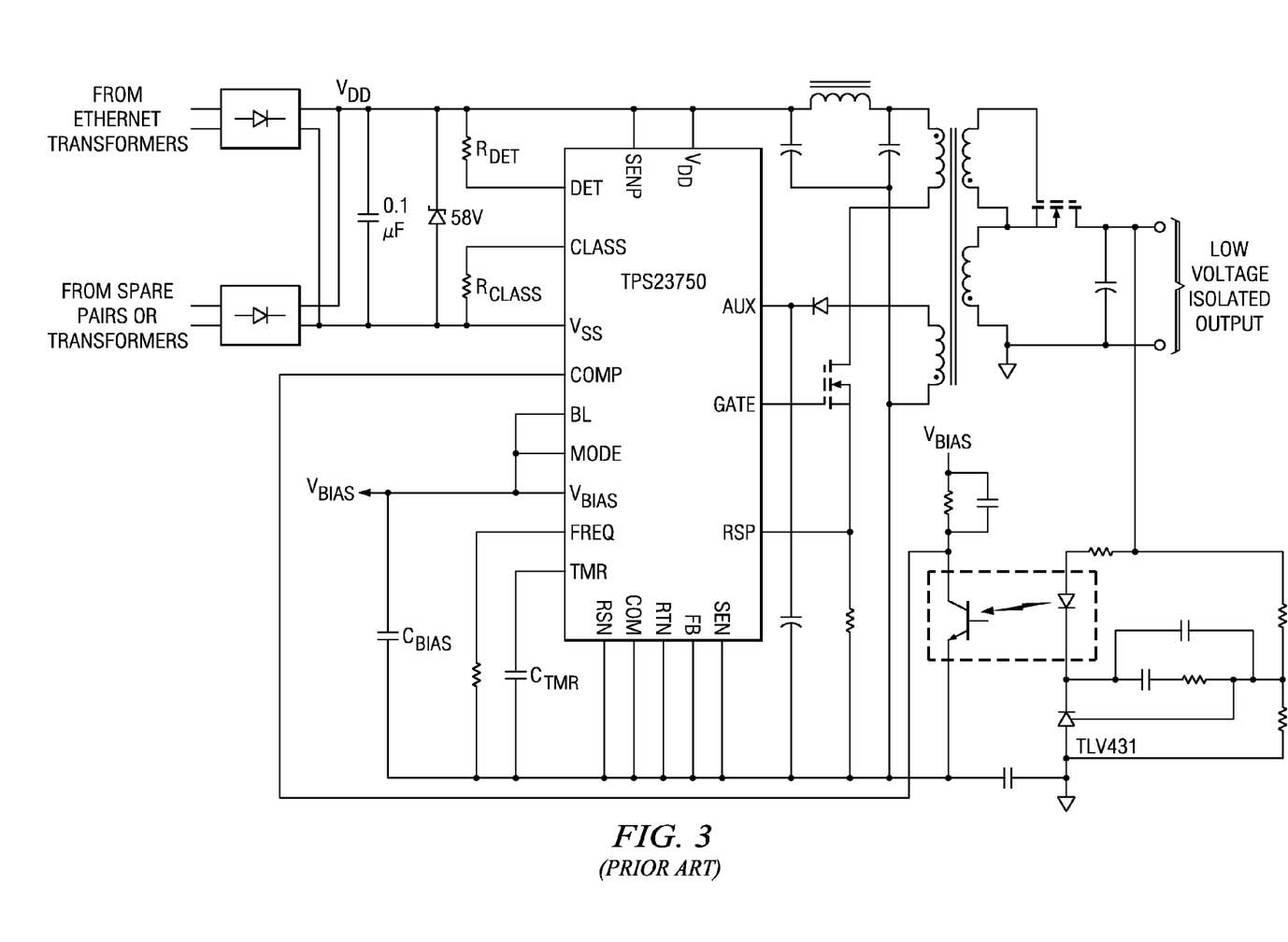
FIG. 3 is a schematic diagram of the circuit shown in the block diagram of FIG. 2.

Traditionally, a discrete solution such as an adjustable shunt regulator circuit (TL431 family) is used to function as the secondary-side controller (i.e., a bandgap and an error amplifier). FIG. 2 shows how a shunt regulator circuit is typically used as the secondary side controller in an isolated converter such as an isolated flyback. In this circuit, resistors $R_1$ and $R_2$ and capacitor $C_c$ are loop compensation elements and resistor $R_3$ is used to set the output voltage (i.e., $V_{out}=(1+R_1/R_3)V_{BG}$, where $V_{BG}$ is 1.24V bandgap voltage). The primary side usually is implemented as a current-mode PWM converter, and its basic block diagram is shown in FIG. 2. To simplify the compensation and increase its robustness, in addition to current- and voltage-loops, a feed-forward path is added through opto-coupler input diode anode. More detailed information on compensation and secondary-side control with shunt regulator circuit devices is shown in FIG. 3. Although illustrated as a flyback converter, these shunt regulator circuits can be used for other isolated topologies such as a forward converters.

Discrete solutions such as shown, however, can not provide closed loop soft start to tightly control output voltage $V_{out}$ during startup sequence. Available solutions with shunt regulators usually use open loop soft-start schemes that control some other voltage or current during the startup such as clamping the $V_{opto}$ cathode voltage ($V_{opto}$) at startup or limiting the transformer current at primary IC. However, since these techniques control $V_{out}$ indirectly (e.g., open loop), $V_{out}$ may experience overshoot during startup (i.e., non monolithic startup). The problem worsens for lower $V_{out}$ values. The cathode voltage of shunt regulator ($V_{opto}$ in FIG. 2) needs minimum of 1.24V for operation, assuming 1V drop for opto coupler diode, and 0.75V on bias resistor $R_{opto1}$, TL431 starts taking over the loop control only when $V_{out}$ has reached about 3V. This can cause soft-start problems if $V_{out}$ final value is set at 3.3V.

Figure 4:
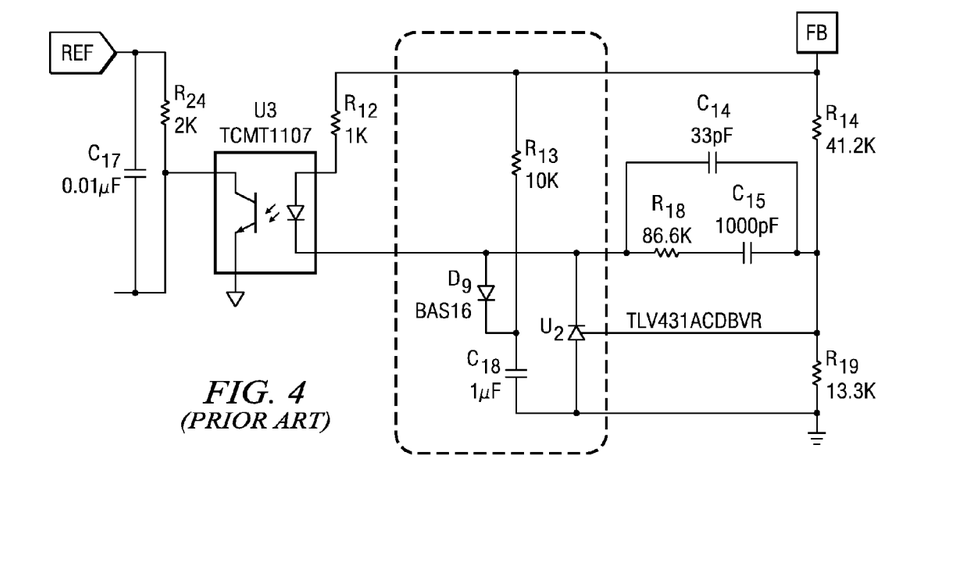
FIG. 4 shows an open-loop soft-start circuit.

It is also known to use an open-loop soft-start circuit using discrete components, as shown in FIG. 4. This circuit utilizes resistor R13, capacitor C18 and diode D9 to implement the open-loop soft-start circuit. Note that this circuit does not compare the output voltage with a reference during start up, so that closed-loop control is not possible.

SUMMARY OF THE INVENTION

It is a general object of the invention to provide an improved soft-start circuit for an isolated switching regulator.

This and other objects and features are attained in accordance with an aspect of the invention by an isolated switching regulator comprising an input side of a first isolating device, the input side circuit generating a switched voltage across the first isolation device. An output side circuit coupled to an output side of the isolating device, the output side circuit generating control signals to control the input side circuit to generate a regulated output voltage. A second isolating device coupled between the output side circuit and the input side circuit for conveying the control signals generated by the output side circuit to the input side circuit, wherein the output side circuit comprises a closed-loop soft-start circuit.

Another aspect of the invention includes a closed-loop soft-start circuit in an isolated switching regulator comprising a primary side circuit coupled via a first isolating device to a secondary side circuit, the secondary side circuit transmitting control signals to the primary side circuit via a second isolating device. A closed-loop soft-start circuit generating control signals during startup of the isolated switching regulator once an output voltage reached substantially $2V_T+VdSSAT$ of the transistors comprising the soft-start circuit where $V_T$ is the threshold voltage and Vdd sat is the drain to source voltage to place an MOS device in saturation and a second isolating device to transmit the control signals to the primary side circuit for controlling the output voltage.

A further aspect comprises an isolated switching regulator comprising a primary winding of a transformer and generating a switched voltage across the transformer primary winding for generating a regulated voltage at an output of the switching regulator. A secondary side circuit coupled to a secondary winding of the transformer for generating control signals to control the primary side circuit to generate the regulated voltage at the output of the switching regulator. An opto-coupler coupled to a control input of the primary side circuit and a control output of the secondary side circuit for transmitting the control signals from the secondary side circuit to the primary side circuit. A closed-loop soft-start circuit able to start closed-loop control of the primary side circuit to regulate the output voltage when the output voltage reaches substantially $2V_T+Vd$ ssat of the transistors of the soft-start circuit, where $V_T$ equals the threshold voltage and VdSSAT equals the drain to source voltage to place an MOS device in saturation.

DETAILED DESCRIPTION OF THE INVENTION

Figure 5:
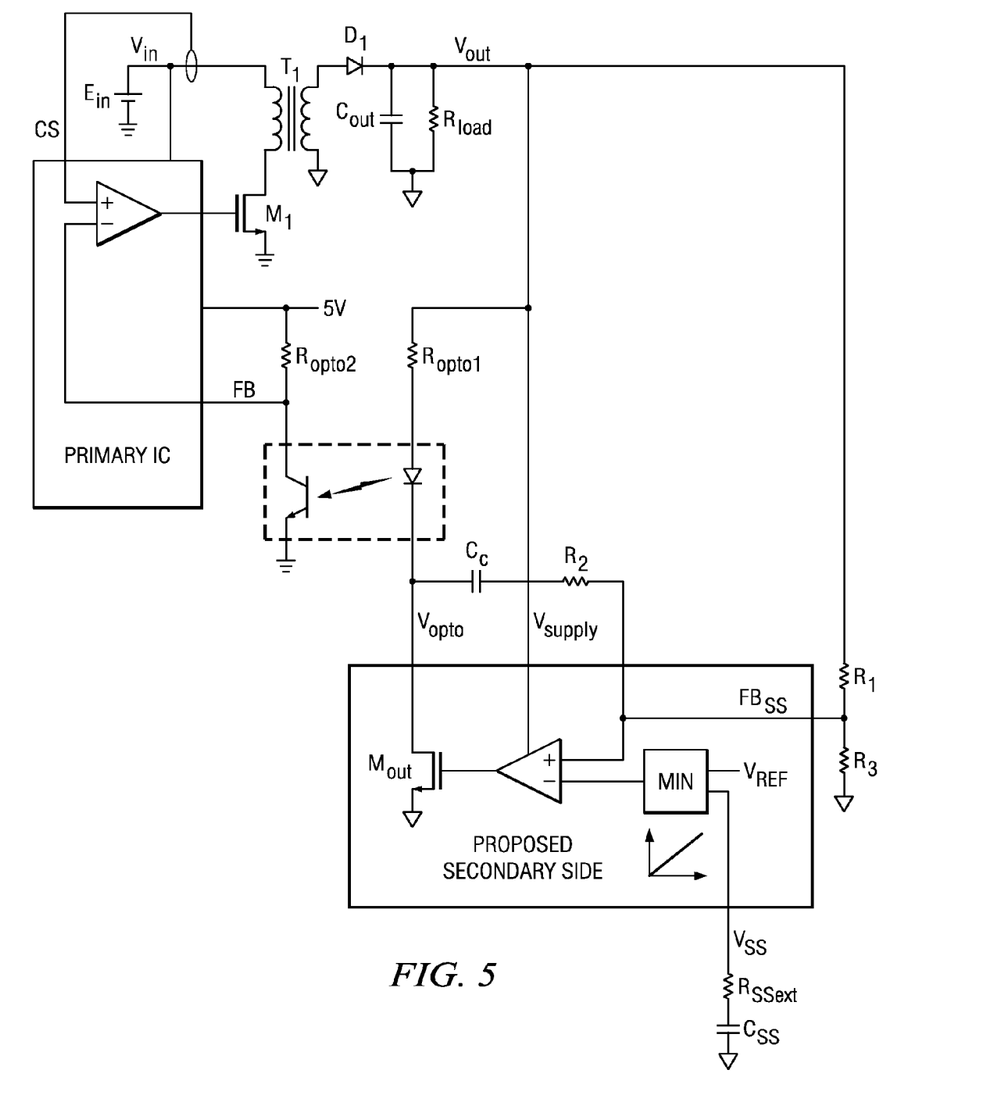
FIG. 5 is a schematic diagram of an isolated switching regulator according to the present invention.
Figure 6:
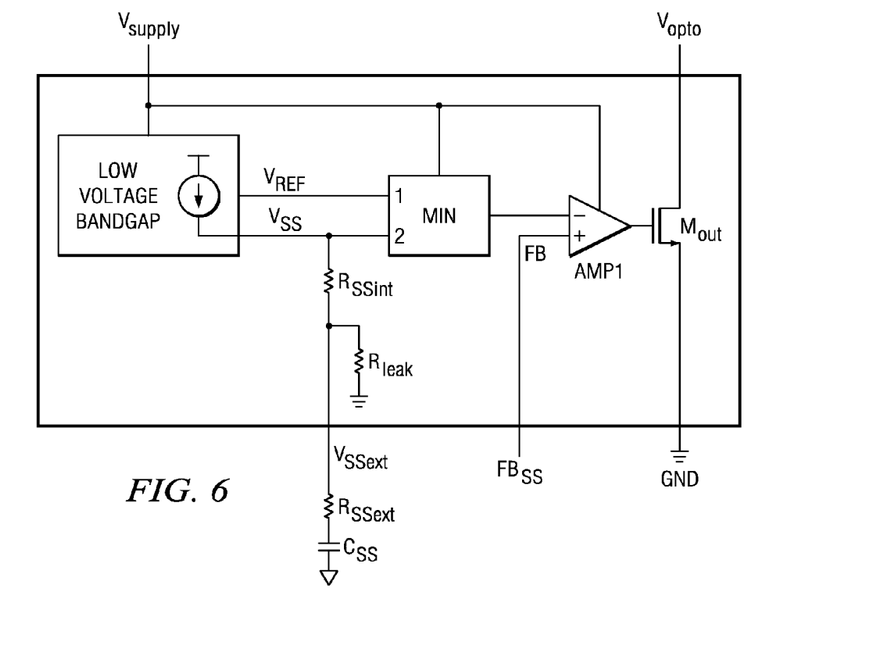
FIG. 6 is a more detailed schematic of the circuit generating the secondary side soft-start ramp.

Our solution proposes a closed loop soft-start scheme to tightly control the output voltage at startup. The circuit consists of an error amplifier Amp1, pull down transistor $M_{out}$, a low-voltage bandgap circuit, and a minimum detection circuit choosing between the lower of soft-start ramp and bandgap reference (FIGS. 5 and 6). Since supply voltage for BG and error amplifier ($V_{supply}$) and pull down transistor output ($V_{opto}$) are separate in proposed topology and $V_{opto}$ can be driven close to zero, the circuit can start regulating for $V_{out}$ as low as 1.8V (worst case) or as low as 1.5V (typical).

The soft-start procedure is as follows. Before $V_{in}$ is applied to primary IC, $V_{out}$ is at zero. When $V_{in}$ is applied to primary, primary FB node is high through a pull down resistor, since there is no control yet from secondary side. Therefore, primary side IC starts switching transistor $M_1$ with high duty cycle. Usually, a current limit function is placed in primary IC to limit the current at startup. Output voltage $V_{out}$ starts to rise with almost no control from secondary side until the voltage is raised enough for secondary side to regulate (about 1.8V). At this point, error amplifier Amp$_1$ tries to regulate $FB_{SS}$ node to minimum of bandgap voltage $V_{REF}$ and soft-start ramp $V_{SS}$. In early phase of startup, $V_{SS}$ is lower than $V_{REF}$ and secondary side regulates the output voltage to $V_{SS}$. Since $V_{SS}$ starts from zero, $V_{opto}$ is pulled down to ground and FB node is pulled low. However, the loop usually is designed such that FB node at the input of primary circuit does not reach zero even when opto input is pulled to the ground, and circuit finds a stable point through its current feedback loop where $V_{out}$ sits at a voltage $V_{plateau}$, which is a function of loop components specifically $R_{opto2}$ This is described below in connection with FIG. 11. Output voltage $V_{out}$ sits at $V_{plateau}$ until $V_{SS}$ rises above $V_{plateau}(R_3/(R_3+R_1))$. At this point, $V_{out}$ starts to rise again since $FB_{SS}$ is following rising $V_{SS}$. Once $V_{SS}$ goes above $V_{REF}$, $FB_{SS}$ is regulated to $V_{BG}$. $V_{SS}$ rises and finally is clamped to about 2.2V.

FIG. 6 shows more of implementation details of the secondary side soft-start ramp. A low-voltage current source generated in low-voltage bandgap unit charges the capacitor $C_{SS}$ once $V_{supply}(V_{out})$ rises enough for circuit to operate. The capacitor is discharged through internal leakage resistor $R_{leak}$ when power supply is disconnected. To start $V_{SS}$ at a non-zero voltage, resistors $R_{SSint}$ and $R_{SSext}$ are added. The shape and timing of soft-start ramp and consequently $V_{out}$ startup can be adjusted by selection of $C_{SS}$ and $R_{SSext}$.

Figure 7:
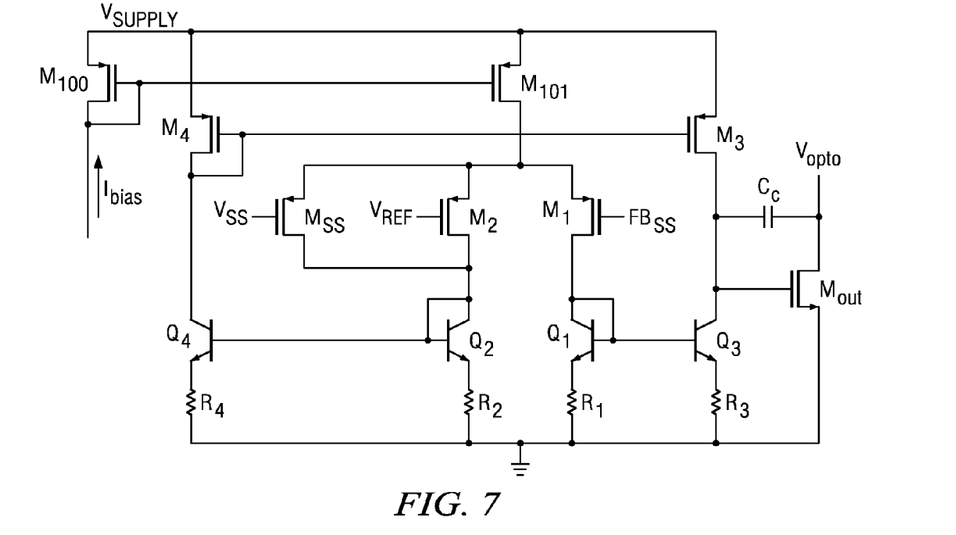
FIG. 7 is a schematic diagram of the error amplifier circuit.

FIG. 7 shows circuit implementation of error amplifier, minimum function, and output pull down transistor. The minimum function is embedded in input stage of the error amplifier by paralleling transistors $M_2$ and $M_{SS}$. The transistor that has the lowest voltage at its gate forms the input stage with transistor $M_1$. Therefore, on system, $FB_{SS}$ node is regulated to the lower of $V_{REF}$ and $V_{SS}$. The amplifier is a symmetrical OTA with a common source output stage consisting of transistor $M_{out}$ and external resistor $R_{opto1}$.

Figure 8:
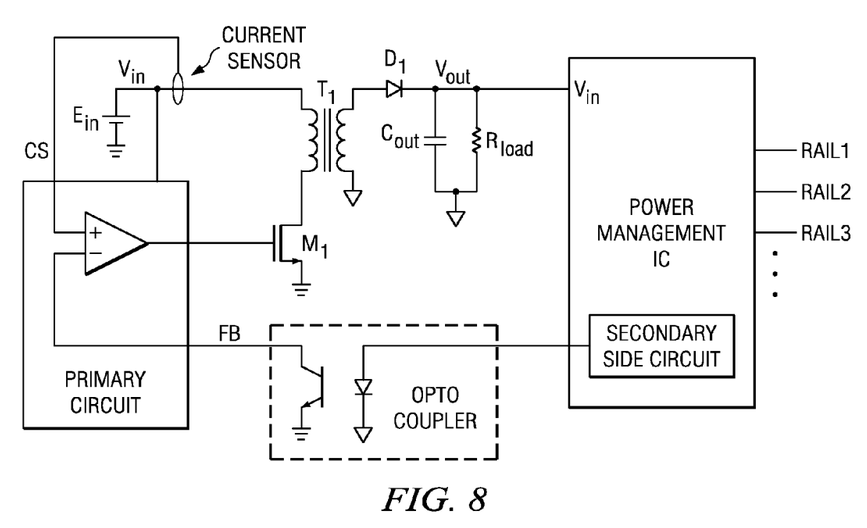
FIG. 8 shows the secondary side circuit integrated within a power management integrated circuit.

As another advantage, the proposed secondary side amplifier can be integrated inside the power management IC that usually follow primary regulator in the system (FIG. 8). In these applications, the high voltage of source is first stepped down safely through an isolated regulator and then this intermediate voltage is converted to voltage rails required in the system.

Figure 9:
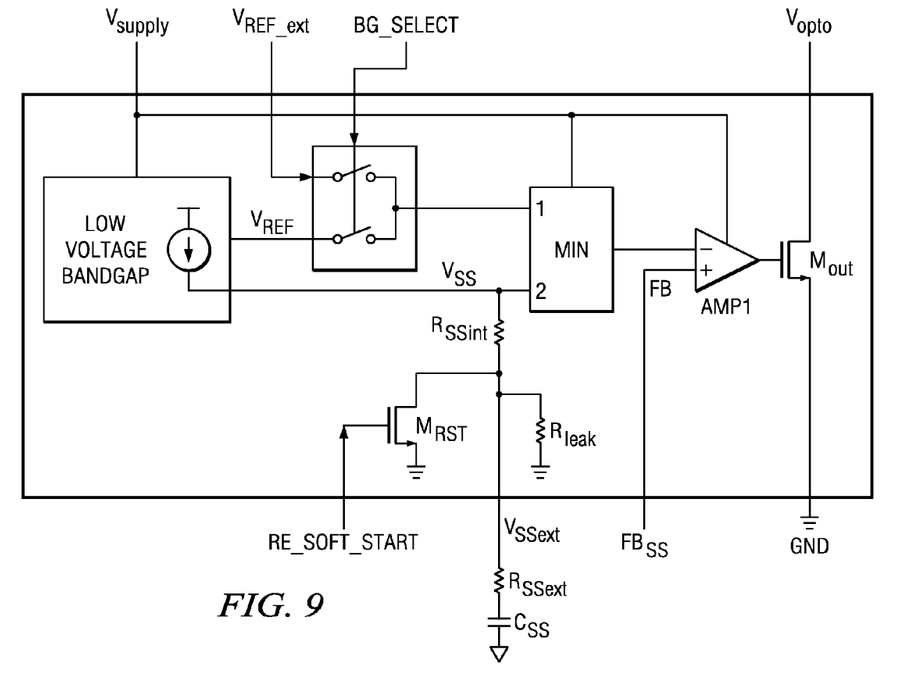
FIG. 9 shows a circuit implementation of a dual reference.

Integration of secondary side controller in power management IC enables implementation of other features. For example, reference voltage can be switched to a more accurate reference, once $V_{out}$ is raised enough. Usually, low voltage bandgap are less accurate and has lower power supply rejection ratio. Therefore, the idea is to soft start the system with a low voltage but low accuracy bandgap and then switch to a higher performance reference, which requires more headroom (FIG. 9).

Restarting the soft-start is another feature that can be implemented on proposed secondary side circuit once it is integrated in the system. When $V_{out}$ has reached its final value after startup, faults such as overload or shorts at the output can bring down the output voltage. Although circuit restarts after the fault is removed, soft start may not reinitiate since there may not be enough time for $R_{leak}$ to discharge soft-start capacitor. Transistor $M_{RST}$ is added to discharge the capacitor $C_{SS}$ and re soft-start the converter when RE_SOFT_START signal is toggled high. RE_SOFT_START signal can be generated by supervisory circuits that monitor $V_{out}$ such as under voltage level.

Figure 10:
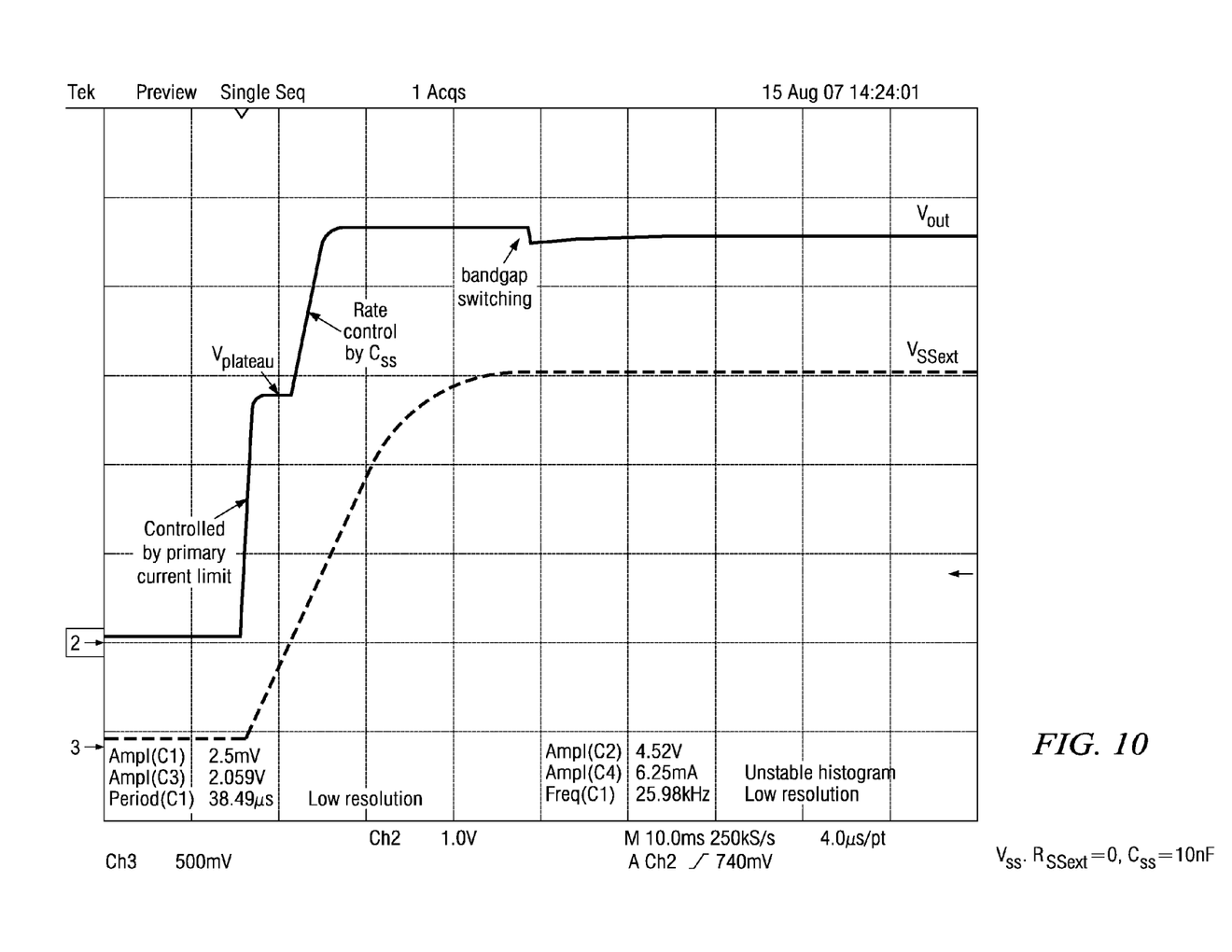
FIG. 10 shows the output and soft-start pin voltages.

FIG. 10 shows the measurement results for an isolated flyback circuit controlled by the proposed secondary side amplifier and soft-start. Channel 3 shows soft start pin ($V_{SSext}$) and Channel 2 shows the output voltage waveform. Upon power up, $V_{ssext}$ ramps from zero until it is clamped at about 2V. As explained before, $V_{out}$ is first ramped up by a rate controlled by current limit of primary side until it exceeds headroom requirements of secondary side circuits. At this point, secondary side takes over. Because of loop setup and since it takes time for soft start ramp to reach initial $V_{out}$ value, $V_{out}$ sits on constant voltage of $V_{plateau}$ until $V_{ss}$ catches up (Time period of which $V_{out}$ stays at $V_{plateau}$ can be adjusted and totally eliminated through selection of $R_{SS}$). At this point, $V_{out}$ follows soft start ramp, and the slope is a function of $C_{ss}$ value and soft-start charging current. When $V_{ss}$ exceeds bandgap voltage $V_{ref}$, secondary side regulates $FB_{SS}$ to $V_{ref}$ or equivalently $V_{out}$ to $(1+R_1/R_3)V_{REF}$. The jump in $V_{out}$ toward the end of the waveforms is when $V_{REF}$ is switched to more accurate bandgap.

Figure 11:
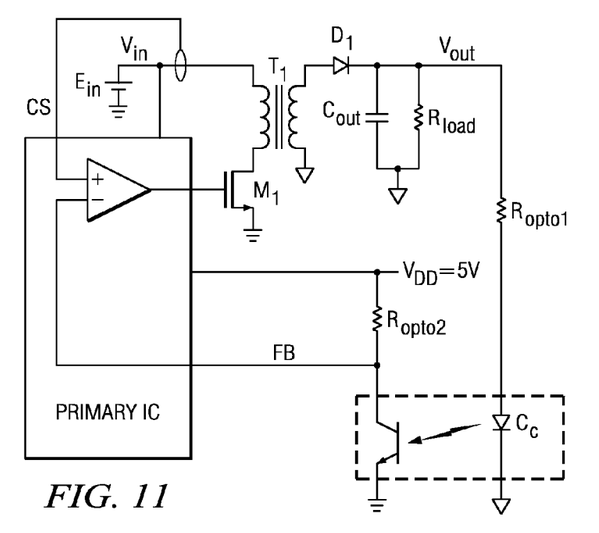
FIG. 11 shows a stable plateau region.

For most of available isolated regulator loops, even when the opto coupler input-side cathode is grounded, the output voltage regulates to a stable point $V_{plateau}$ (FIG. 10) determined by loop components. This phenomenon further explained for a simplified isolated loop shown in FIG. 11. The loop tries to make the signals at the input of primary side PWM comparator equal. Therefore, $$R_{sense}I_{Lmax} = V_{FB}, \quad (1)$$

where $R_{sense}$ is the current-sensing gain and $I_{Lmax}$ is the transformer primary side current peak. The loop is usually designed in a way that even when the opto coupler diode cathode is grounded, the $V_{FB}$ node is not at zero, but is pulled down to $$V_{DD} - (V_{out} - V_{diode})\frac{R_{opto2}}{R_{opto1}},$$

where $V_{diode}$ is the opto coupler input diode voltage, $V_{DD}$ is the reference voltage from primary IC (usually 5V), and opto coupler gain is assumed to be one. Therefore, $V_{out}$ finds a stable point to satisfy the following condition $$R_{sense} I_{Lmax} = \left[V_{DD} - (V_{out} - V_{diode}) \frac{R_{opto2}}{R_{opto1}}\right]. \quad (2)$$

Since for a converter working in continuous-time PWM operation, $I_{Lmax}$ can be specified as a function of input voltage, output voltage, and the load or equivalently $I_{Lmax}=f(V_{out})$. Therefore, $V_{out}$ regulates to a stable point determined by loop components such as current-sensing gain, VDD voltage, and opto coupler resistor ratio (i.e., $V_{out\_Plateau}=f(R_{opto2}/R_{opto1}, R_{sense}, V_{DD})$). Other loop parameters affect the plateau voltage only as second-order effects. For TI isolated flyback boards, $R_{opto2}/R_{opto1}=2$, $V_{DD}=5V$, and $V_{out\_Plateau}=2.4V$.

Advantages of the present invention include a closed loop soft-start for isolated regulators thereby providing closer control over the output voltage and lower headroom requirement for secondary side amplifier compared to prior art shunt regulators, seamless transition from soft-start to normal operation (i.e., implementation of minimum function using transistors $M_2$ and $M_{SS}$ in FIG. 7). It also provides control over duration of $V_{plateau}$ region. Adding resistor $R_{SS}$ in series with soft-start capacitor causes soft start ramp to start higher than zero and therefore soft-start ramp reaching plateau voltage sooner. Adding enough $R_{ss}$ can totally eliminate plateau region and result in monolithic startup. The addition of re soft-start feature (RE_SOFT_START) and switching from a crude but low-voltage bandgap to accurate, high performance bandgap when $V_{out}$ has raised close to its final value.

Although the present invention has been described with reference to a specific embodiment, it is not limited to this embodiment and no doubt alternatives will occur to the skilled person that lie within the scope of the invention as claimed.

The invention claimed is:

1. An isolated switching regulator comprising:
   a input side circuit coupled to an input side of a first isolating device, the input side circuit generating a switched voltage across the first isolation device;
   an output side circuit coupled to an output side of the isolating device, the output side circuit generating control signals to control the input side circuit to generate a regulated output voltage;
   a second isolating device coupled between the output side circuit and the input side circuit for conveying the control signals generated by the output side circuit to the input side circuit, wherein the output side circuit comprises a closed-loop soft-start circuit, and wherein the closed-loop soft-start circuit comprises:
   an error amplifier having a first input coupled to a lower of a reference voltage and a one-time ramp voltage and having a second input coupled to a voltage representative of the regulated output voltage, the soft-start circuit regulating the output voltage to the ramp voltage until it exceeds the reference voltage.

2. The isolated switching regulator of claim 1 wherein the first isolating device is a transformer.

3. The isolated switching regulator of claim 1, wherein the second isolating device is an opto-coupler.

4. The isolated switching regulator of claim 2, wherein the second isolating device is an opto-coupler.

5. The isolated switching regulator of claim 1 further comprising:
   a pull-down transistor coupled to the second isolating device, for operating the second isolating device.

6. The isolated switching regulator of claim 4 further comprising:
   a pull-down transistor coupled to the opto-coupler for operating the opto-coupler.

7. An isolated switching regulator comprising:
   a input side circuit coupled to an input side of a first isolating device, the input side circuit generating a switched voltage across the first isolation device;
   an output side circuit coupled to an output side of the isolating device, the output side circuit generating control signals to control the input side circuit to generate a regulated output voltage;
   a second isolating device coupled between the output side circuit and the input side circuit for conveying the control signals generated by the output side circuit to the input side circuit, wherein the output side circuit comprises a closed-loop soft-start circuit, and wherein the closed-loop soft-start circuit comprises:
   an error amplifier having a first input coupled to a lower of a reference voltage and a ramp voltage and having a second input coupled to a voltage representative of the regulated output voltage, wherein the closed-loop soft-start circuit can begin control of the regulated output voltage when it reaches a level equal to substantially 2 $V_T$+VdSSAT of the transistors comprising the soft-start circuit, where $V_T$ equals the threshold voltage and VdSSAT is the drain to source voltage to place an MOS device in saturation.

8. The isolated switching regulator of claim 7 where the voltage 2 $V_T$+VdSSAT is substantially 1.6 volts.

9. The isolated switching regulator of claim 1 further comprising a reset circuit that will cause the isolated switching regulator to resoft-start after a fault on the output voltage.

10. In an isolated switching regulator comprising:
    a primary side circuit coupled via a first isolating device to a secondary side circuit, the secondary side circuit transmitting control signals to the primary side circuit via a second isolating device, a closed-loop soft-start circuit generating control signals during startup of the isolated switching regulator once an output voltage reaches substantially 2 $V_T$+VdSSAT of the transistors comprising the soft-start circuit where $V_T$ is threshold voltage and VdSSAT is the drain to source voltage to place an MOS device in saturation; and driver means to drive the second isolating device to transmit the control signals to the primary side circuit for controlling the output voltage.

11. The isolated switching regulator of claim 10 wherein the first isolating device is a transformer.

12. The isolated switching regulator of claim 10 wherein the second isolating device is a opto-coupler.

13. The isolated switching regulator of claim 11 wherein the second isolating device is a opto-coupler.

14. The closed-loop soft-start circuit of claim 10 further comprising a reset circuit that will cause the isolated switching regulator to resoft-start after a fault on the output voltage.

15. An isolated switching regulator comprising:
    a primary side circuit coupled to a primary winding of a transformer and generating a switched voltage across the transformer primary winding for generating a regulated voltage at an output of the switching regulator;

a secondary side circuit coupled to a secondary winding of the transformer for generating control signals to control the primary side circuit to generate the regulated voltage at the output of the switching regulator;

an opto-coupler coupled to a control input of the primary side circuit and a control output of the secondary side circuit for transmitting the control signals from the secondary side circuit to the primary side circuit; and a closed-loop soft-start circuit able to start closed-loop control of the primary side circuit to regulate the output voltage when the output voltage reaches substantially 2 $V_T$+VdSSAT of the transistors of the soft-start circuit, where $V_T$ equals the threshold voltage and VdSSAT equals the drain to source voltage to place an MOS device in saturation.

16. The isolated switching regulator of claim 15 wherein 2 $V_T$+VdSSAT equals substantially 1.6 volts.

17. The isolated switching regulator of claim 15 further comprising a reset circuit that will cause the isolated switching regulator to resoft-start after a fault on the output voltage.

18. The isolated switching regulator of claim 16 further comprising a reset circuit that will cause the isolated switching regulator to resoft-start after a fault on the output voltage.

* * * * *